United States Patent
Hahn et al.

(10) Patent No.: US 7,907,041 B2
(45) Date of Patent: Mar. 15, 2011

(54) CLADDING ELEMENT WITH AN INTEGRATED RECEPTION UNIT FOR THE CONTACTLESS TRANSFER OF ELECTRICAL ENERGY AND METHOD FOR THE PRODUCTION THEREOF

(75) Inventors: Wolfgang Hahn, Kassel (DE); Qinghua Zheng, Taufkirchen (DE); Andreas Diekmann, Müchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 0 days.

(21) Appl. No.: 12/444,913

(22) PCT Filed: Sep. 5, 2007

(86) PCT No.: PCT/DE2007/001576
§ 371 (c)(1),
(2), (4) Date: Apr. 9, 2009

(87) PCT Pub. No.: WO2008/043327
PCT Pub. Date: Apr. 17, 2008

(65) Prior Publication Data
US 2010/0097168 A1    Apr. 22, 2010

(30) Foreign Application Priority Data
Oct. 11, 2006 (DE) .......... 10 2006 048 831

(51) Int. Cl.
H01F 21/06 (2006.01)
H01F 27/02 (2006.01)
(52) U.S. Cl. .......... 336/90; 336/117; 336/119; 336/115

(58) Field of Classification Search .......... 336/96, 336/92, 90
See application file for complete search history.

(56) References Cited

U.S. PATENT DOCUMENTS

| | | | |
|---|---|---|---|
| 6,781,496 B2 * | 8/2004 | Kobayashi et al. | 336/107 |
| 7,367,512 B2 * | 5/2008 | Laude | 235/492 |
| 2003/0052679 A1 * | 3/2003 | Morris et al. | 324/318 |
| 2003/0178500 A1 * | 9/2003 | Ehrsam et al. | 238/3 |
| 2004/0041676 A1 * | 3/2004 | Okamoto | 336/90 |
| 2005/0064059 A1 * | 3/2005 | Zellerohr et al. | 425/200 |

FOREIGN PATENT DOCUMENTS

| | | |
|---|---|---|
| DE | WO 2005/090112 | 9/2005 |
| DE | 102004056439 | 10/2005 |
| EP | 0 549 110 A1 | 6/1993 |
| JP | 58 135619 | 8/1983 |
| JP | 03 178505 | 8/1991 |

* cited by examiner

*Primary Examiner* — Anh T Mai
(74) *Attorney, Agent, or Firm* — McGlew & Tuttle, P.C.; John James McGlew (57) ABSTRACT

A cladding (cover) element (32) includes a reception unit which is integrated therein. The reception unit contains a receiving coil (10) for the contactless transfer of electric energy and a plurality of flux-conducting elements (15a, 15b; 16a, 16b) that are associated with the receiving coil (10) for concentrating the field strength. The cover element (32) is made of a fiber-reinforced plastic. The flux-conducting elements (15a, 15b; 16a, 16b) and the receiving coil (10) are arranged in a base body (18) that is used to position the elements and coil and are embedded with the base body (18) in the cladding element (32). A process is also provided for producing the cladding element (32).

27 Claims, 7 Drawing Sheets

CLADDING ELEMENT WITH AN INTEGRATED RECEPTION UNIT FOR THE CONTACTLESS TRANSFER OF ELECTRICAL ENERGY AND METHOD FOR THE PRODUCTION THEREOF

CROSS REFERENCE TO RELATED APPLICATIONS

This application is a United States National Phase application of International Application PCT/DE2007/001576 and claims the benefit of priority under 35 U.S.C. §119 of German Patent Application DE 10 2006 048 831.8 filed Oct. 11, 2006, the entire contents of which are incorporated herein by reference.

FIELD OF THE INVENTION

The present invention pertains to a cover element with a receiving unit, which is integrated in same and which contains a receiver coil for the contactless transmission of electric power and a plurality of flux-conducting elements, which are associated with the receiving coil and are intended to concentrate the field intensity, and which are formed of a material having high permeability compared to that of air and further relates to a process for manufacturing a cover element

BACKGROUND OF THE INVENTION

Cover elements (cladding elements) of this type are known especially in magnetic levitation vehicles (DE 10 2004 056 439 A1). The receiving unit having a receiver coil is used for the contactless, inductive transmission of electric power from a track to a vehicle. At least one primary conductor, which is connected to a power source and is designed as a transmitting coil, is provided for this purpose at the track and at least one secondary receiver coil is provided at the vehicle. The receiving unit including the contacting elements belonging to it in the form of plug-type connectors or the like is mounted on a shell-like cover element, which covers a magnetic back box on a side facing the track or is integrated in same. Among other things, carrier magnets for the magnetic levitation vehicle and the means needed for controlling same, which can be operated with the electric power supplied by the receiver coil, are accommodated in the magnetic back box, which is connected via frame straps to an undercarriage or body of the vehicle. An autonomous assembly unit for the "carrying" function is thus obtained.

To improve the magnetic coupling between the primary conductor and the receiver coil and to avoid eddy current losses, the receiver coil is provided with means for concentrating the lines of magnetic flux generated by the primary conductor on its side facing away from the primary conductor. These means contain flux-conducting elements in the form of strips and connection elements connecting the ends thereof, which said connection elements are made of a material with high permeability and high electric resistance, preferably a ferrite, especially a soft ferrite. The strips and connection elements are connected into a grid frame, which is to be placed on the receiver coil, by bonding or according to another method.

The manufacture of flux-conducting elements from a material such as ferrite or the like is carried out by pressing and subsequent sintering of a powder prepared from this material. The flux-conducting elements obtained hereby are comparatively brittle, mechanically delicate and poorly processable. In addition, the joining of the flux-conducting elements into a grid frame is very labor-intensive.

For the same reason, the usual fastening of the receiver coil and of the flux-conducting elements to the cover element by screwing, bonding or the like is not simple. In addition, there is a risk that the flux-conducting elements will be destroyed or become separated because of the mechanical vibrations and shocks occurring during the operation of the magnetic levitation vehicle, which makes undesired maintenance and repair work necessary.

SUMMARY OF THE INVENTION

Based on this, the basic technical object of the present invention is to design the cover element of the class described in the introduction such that its manufacture is simplified, the flux-conducting elements are securely integrated in the cover element and long service life is therefore attained even when they consist of a brittle, easily breakable material.

The present invention offers the advantage that a receiving unit, which comprises the basic body with the flux-conducting elements and the receiver coil, is preferably completely embedded in the cover element manufactured from a fiber-reinforced plastic. Additional means for fastening the receiving unit at or in the cover element are not therefore necessary. In addition, not only are the flux-conducting elements positioned based on their arrangement in the basic body, but they are also held securely and protected against mechanical shocks. This is especially true when the basic body is manufactured from a foam with damping action, which is preferred.

The present invention will be explained in more detail below in connection with the attached drawings on the basis of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
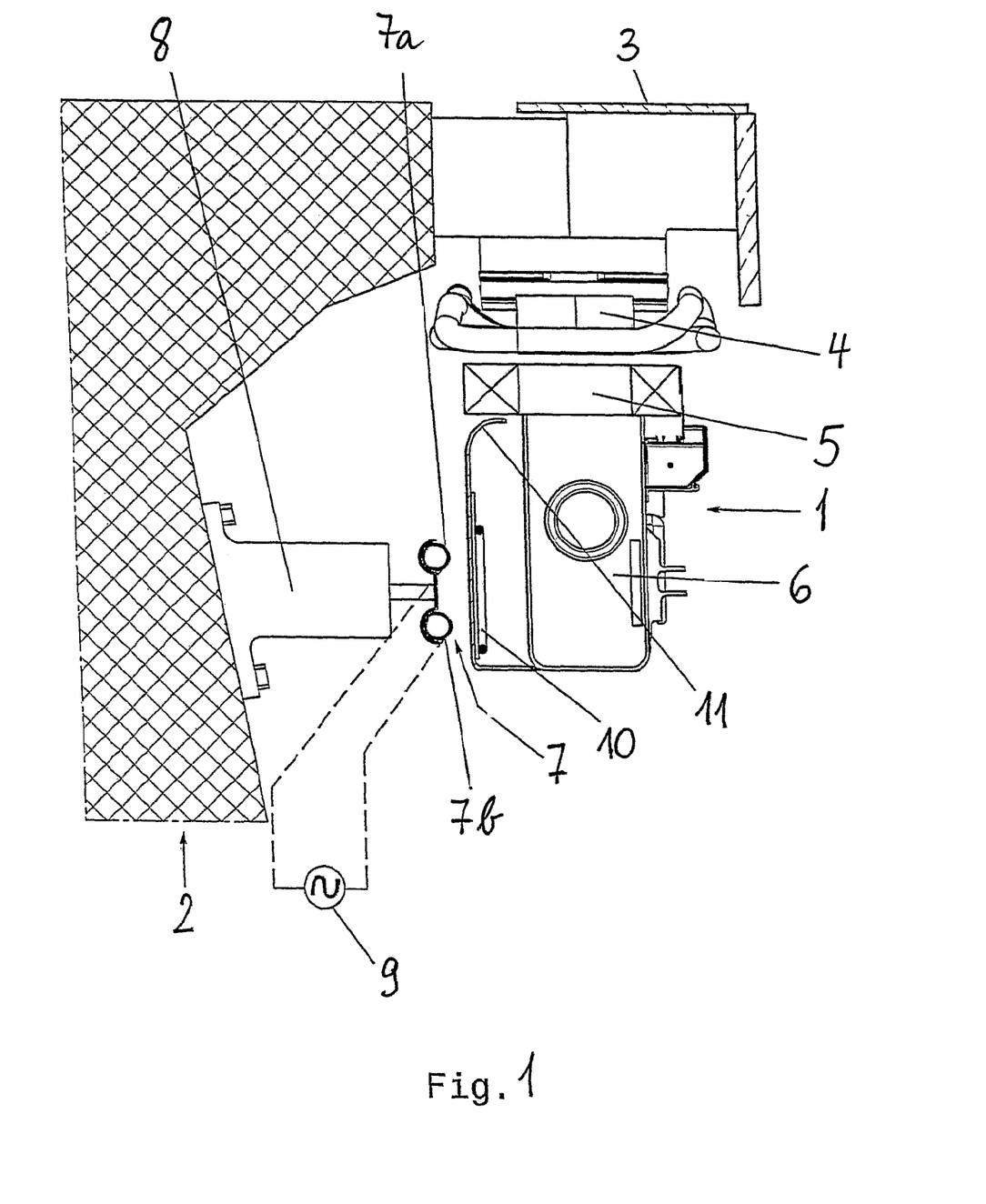
FIG. 1 is a schematic view showing a partial section through a usual magnetic levitation vehicle in the area of a track provided with a long stator.

Referring to the drawings in particular, FIG. 1 schematically shows a cross section through a magnetic levitation vehicle 1, which is mounted in the usual manner in such a way that it is able to travel on a track, which extends in the longitudinal direction of a line and which contains carriers 2 manufactured from steel and/or concrete and track panels 3 mounted thereon. The magnetic levitation vehicle 1 is driven by means of a long-stator motor, which has stator packages 4 that are fastened under the track panel 3 and follow each other in the longitudinal direction thereof. The energizing field of the long-stator motor is generated by at least one magnet array provided with carrier magnets, which has magnet poles facing the grooves of the stator packages 4, which said grooves are open downwardly in FIG. 1. Not only does the carrier magnet 5 provide the energizing field, but it also assumes the carrying and levitating function by maintaining a preset gap between the carrier magnet 5 and the stator packages 4 during the operation of the magnetic levitation vehicle 1. The magnet array containing the carrier magnets 5 is otherwise accommodated in a magnetic back box 6, which is fastened to the magnetic levitation vehicle 1 via laterally arranged frame straps.

A primary conductor 7, which is designed as a transmitting coil, preferably contains a line section 7a, 7b running back and forth and preferably extends over the entire length of the track, is provided along the track. The two line sections 7a, 7b are fastened to the carrier 2, e.g., by means of a bracket 8 consisting of an insulator. The primary conductor 7 is connected, in addition, to a power source 9 of, e.g., 200 A, which is preferably a high-frequency power source and is shown only schematically.

A receiving unit with a receiver coil 10 is mounted on the magnetic levitation vehicle 1. This receiver coil 10 is preferably designed such that it does not extend around the primary conductor 7 but is located opposite same at a short distance only. The receiver coil 10 preferably comprises a plurality of parallel conductors, which are arranged relative to the primary conductor 7 such that they are passed through by the lines of magnetic flux generated by this primary conductor 7 or the line sections 7a, 7b and the current of approx. 200 A supplied by the primary conductor 7 can be uncoupled at the terminal ends thereof, not shown. The two terminal ends, not shown, of the receiver coil 10 are connected in the known manner, e.g., with a voltage transformer, which is part of a usual power supply unit, which supplies the magnetic levitation vehicle 1 with the electric power necessary for its operation. It is clear that corresponding primary conductors 7 are preferably installed on both sides of the carrier 2 when the magnetic levitation vehicles 1 are provided with carrier magnets 5 on both longitudinal sides and that as many receiving units are provided in the longitudinal direction of the magnetic levitation vehicles 1 as are necessary for the operation of the magnetic levitation vehicles 1 or desirable for reasons of redundancy.

The receiver coil 10 is preferably manufactured as a prefabricated assembly unit together with the necessary contacting elements, e.g., plug-type connectors, and mounted on the magnetic back box 6. It is especially advantageous to accommodate the receiver coil 10 at or in a shell-like cover element 11, which is fastened to a rear side of the magnetic back box 6, which said rear side faces the primary conductor 7.

Figure 2:
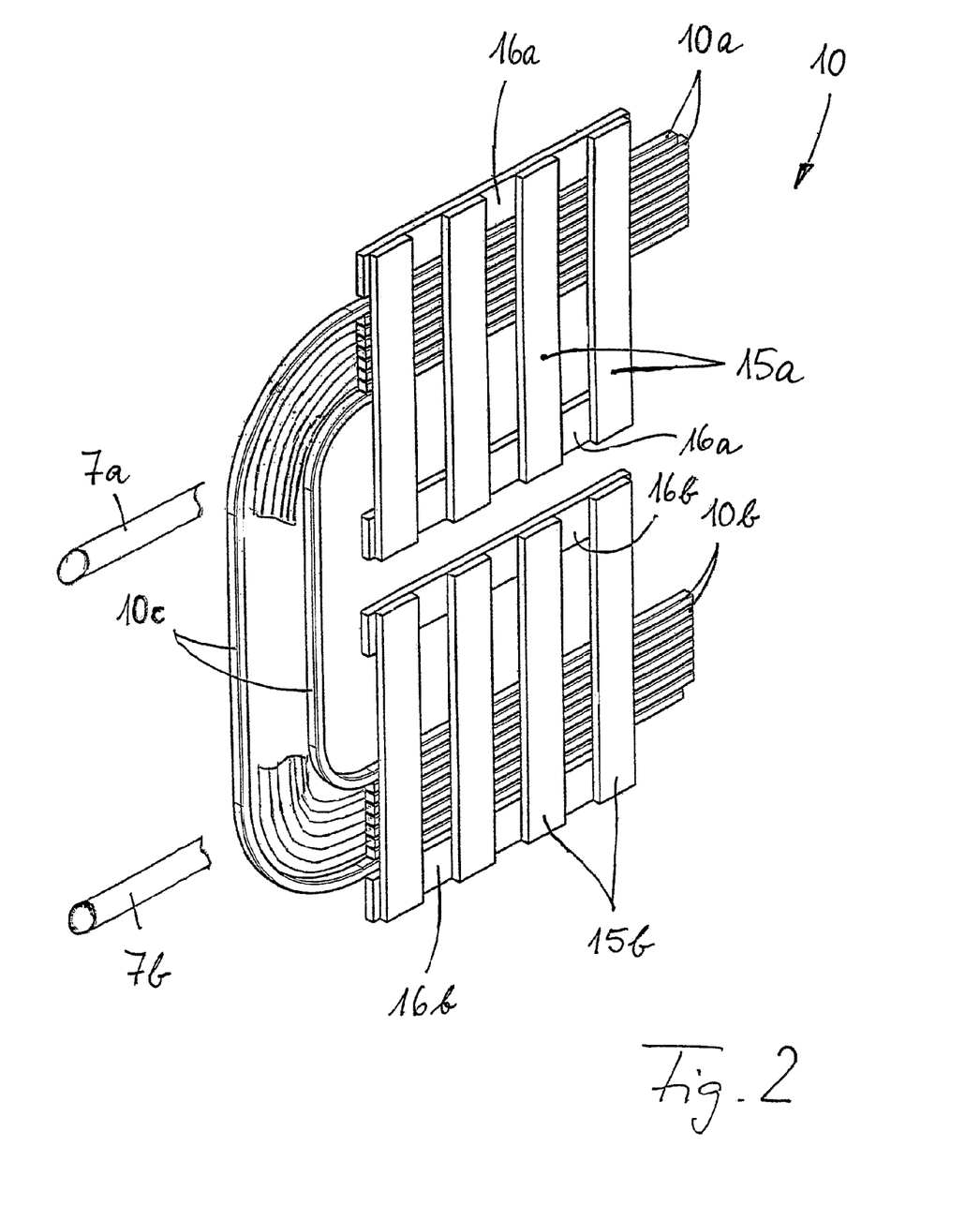
FIG. 2 is a schematic perspective and greatly enlarged view of a part of a receiving unit.

The receiver coil 10 is preferably designed in the manner of a so-called layer winding. As is shown in FIG. 2, it contains a plurality of layers located in one plane. The individual layers are preferably made of a conductor with round or square cross section and have essentially straight first and second longitudinal sections 10a, 10b, which extend in parallel to one another and along the magnet array, as well as end windings 10c, which connect the ends thereof. The longitudinal sections 10a, 10b extend in parallel to the line sections 7a, 7b of the primary conductor 7 and are used to generate voltage. The first longitudinal sections 10a are associated with line section 7a and the second longitudinal sections 10b are associated with line section 7b of the primary conductor 7 such that the line sections 7a, 7b are arranged approximately in the middle of the layer part formed by the associated longitudinal sections 10a, 10b, as is shown especially in FIG. 3. By contrast, the conductors of the receiver coil 10 extend in the area of the end windings 10c essentially at right angles to the line sections 7a and 7b, respectively.

Figure 3:
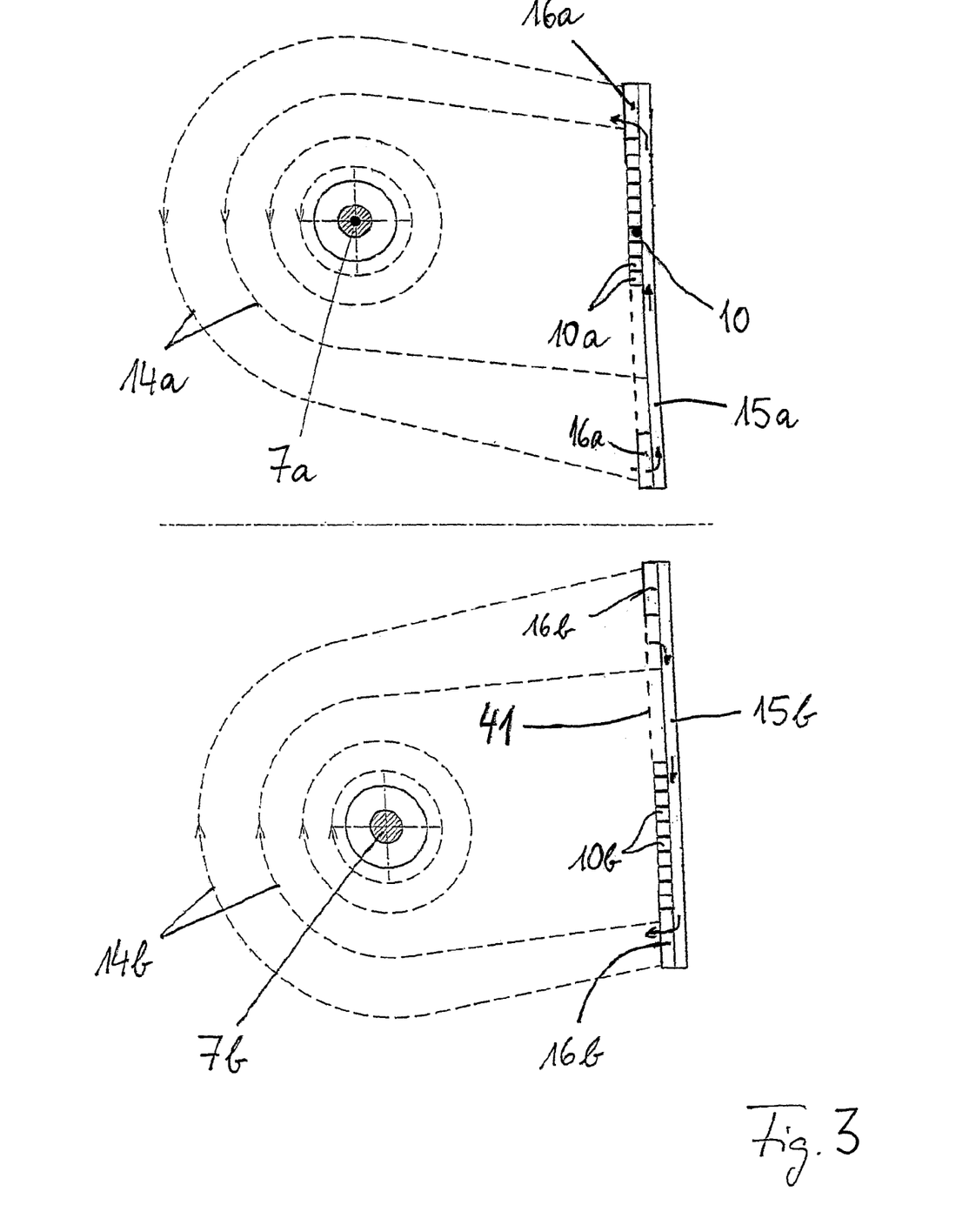
FIG. 3 is a schematic view showing a cross section through the receiving unit and the primary conductor according to FIG. 2.

To increase the magnetic coupling between the primary conductor 7 and the receiver coil 10 and to avoid eddy current losses, the receiving unit has, furthermore, on the side of the receiver coil 10 facing away from the primary conductor 7, a means for concentrating the field intensity generated by the primary conductor 7, as it is schematically indicated by lines of magnetic flux 14a, 14b in FIG. 3. This means contains flux-conducting elements, which consist of a material with high permeability and high electrical resistivity. An especially preferred material for this purpose is ferrite, especially soft ferrite, which is, however, comparatively brittle, mechanically delicate and therefore poorly processable because it is manufactured from ferromagnetic powders by pressing and subsequent sintering. The flux-conducting elements are therefore composed of many, comparatively small strips of material and connection elements, which are connected to one another by bonding or according to other methods to form grid frames.

A plurality of first material strips 15a, which are arranged essentially at right angles to the line section 7a and in parallel to the winding plane formed by the longitudinal sections 10a, are provided, e.g., on a side of the receiver coil 10 facing away from line section 7a in a construction likewise shown in FIGS. 2 and 3. A plurality of second material strips 15b, which are preferably located in the same plane as the first material strips 15a, are provided in a corresponding arrangement on a side of the receiver coil 10 facing away from line section 7b. Both material strips 15a, 15b have a length that is somewhat greater than the height of the layer parts formed by the longitudinal sections 10a, 10b, without overlapping with the ends facing each other. The individual material strips 15a, 15b are arranged in a grid-like pattern and in parallel to one another at preselected distances.

The ends of the first material strips 15a are connected to one another by first connection elements 16a, which are arranged essentially in parallel to line section 7a. The ends of the second material strips 15b are correspondingly connected by second connection elements 16b. Components designed in the manner of grid frames are formed as a result.

Both the material strips 15a, 15b and the connection elements 16a and 16b preferably consist of a ferrite. In addition, they are arranged close behind the longitudinal sections 10a, 10b and are arranged such that they bring about a concentration of the lines of flux 14a and 14b generated by the line sections 7a, 7b, as this is schematically indicated in FIG. 3. It is assumed in FIG. 3 that the current flows through line section 7a momentarily in a direction exiting from the drawing plane and it flows through line section a 7b momentarily in a direction entering the drawing plane. Because of the high permeability of the material strips 15a, 15b, the lines of flux 14a, 14b are closed directly behind the line sections 10a, 10b, as is schematically indicated by arrows, as a result of which the magnetic coupling is greatly increased. Higher eddy current losses are at the same time prevented from developing because the material strips 15a, 15b and connection elements 16a, 16b magnetically shield the parts of the magnetic back box 6 located behind them because of their high permeability. Finally, the connection elements 16a, 16b shall bring about an extensively uniform distribution of the magnetic flux within the grid frame structure. The length of the material strips 15a, 15b and of the connection elements 16a, 16b is therefore preferably selected to be such that the largest possible number of lines of flux 14a, 14b are collected or concentrated.

The connection elements 16a, 16b are preferably fastened on the sides of the material strips 15a, 15b facing the line sections 7a, 7b. This leads to the advantage that they come to lie essentially in the same plane as the longitudinal sections 10a, 10b of the receiver coil 10, as is shown especially in FIG. 3. As a result, no additional space is required for them, especially if their thickness, which is sufficient from a magnetic point of view, is approximately equal to the thickness of the longitudinal sections 10a, 10b.

Receiving units of the type described are known from the document DE 10 2004 056 439 A1 (and corresponding application publication US 2008236973), which is made into the subject of the present disclosure by reference to avoid further repetitions.

To simplify the manufacture of the grid frame comprising the strips 15a, 15b and connection elements 16a, 16b, a basic body 18 (FIG. 4) is used according to the present invention as a starting component, which is provided with depressions in the form of grooves or the like wherever the flux-conducting elements are to come to lie and can therefore be considered to be an organizing auxiliary means. Webs left in place between the depressions are designed such that their surfaces can also be used, at least partially, as contact surfaces for the receiver coil 10.

As is apparent from FIGS. 4 through 7, the basic body 18 is manufactured in the exemplary embodiment from an originally plane-parallel panel, which has, like the receiver coil 10, an essentially rectangular outer contour and has accordingly two long longitudinal sides 18a arranged in parallel to one another and two short, likewise essentially parallel front sides 18b arranged at right angles thereto. In addition, the basic body 18 is divided by a middle web 19 extending in parallel to the longitudinal sides 18a into two halves, which are essentially mirror-symmetrical in relation to this.

Figure 4:
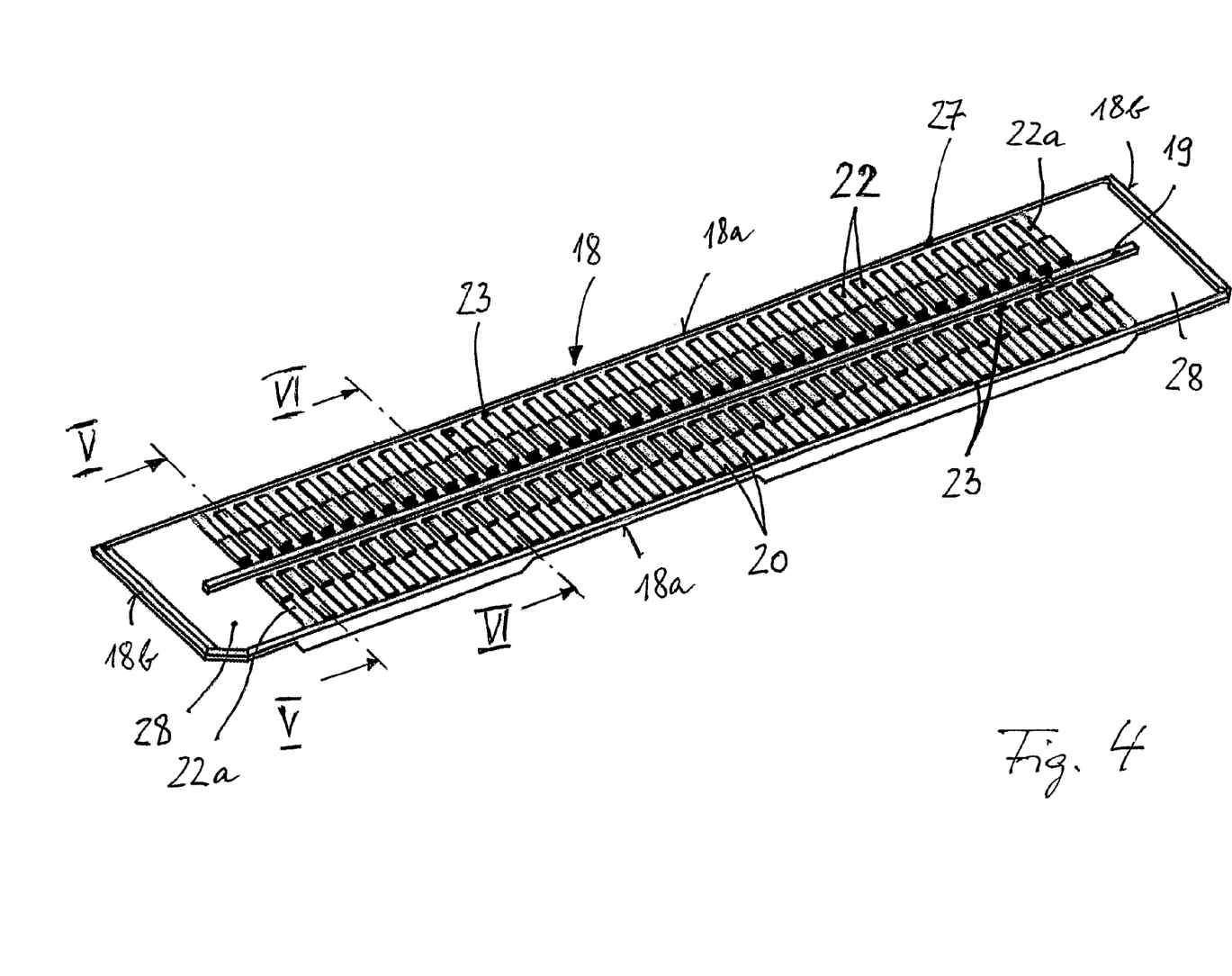
FIG. 4 is a perspective view of a basic body according to the present invention which can be used to manufacture the receiving unit according to FIGS. 2 and 3.
Figure 5:
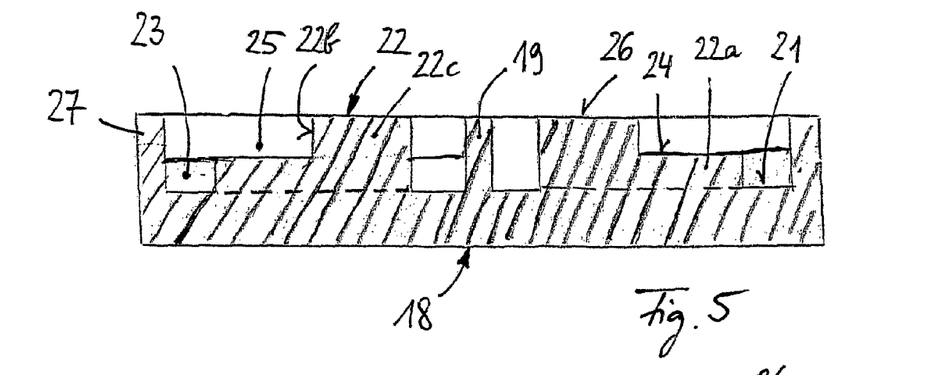
FIG. 5 is a sectional view showing enlarged sections along line V-V in FIG. 4.
Figure 6:
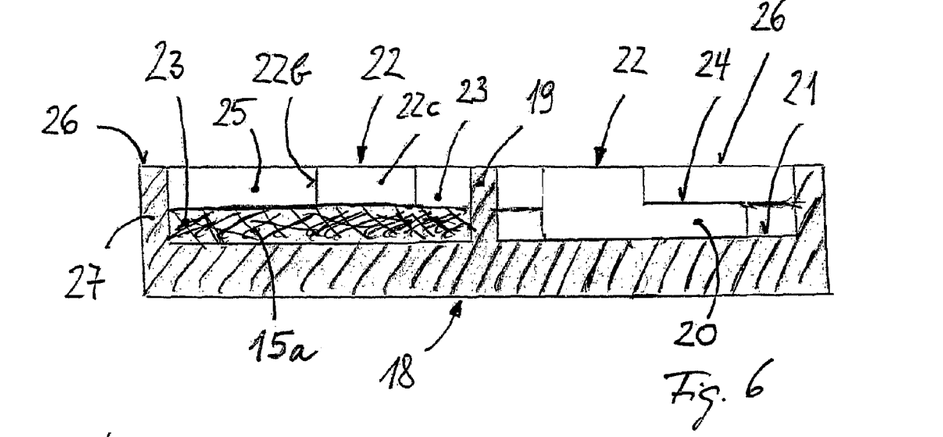
FIG. 6 is a sectional view showing enlarged sections along line VI-VI in FIG. 4.
Figure 7:
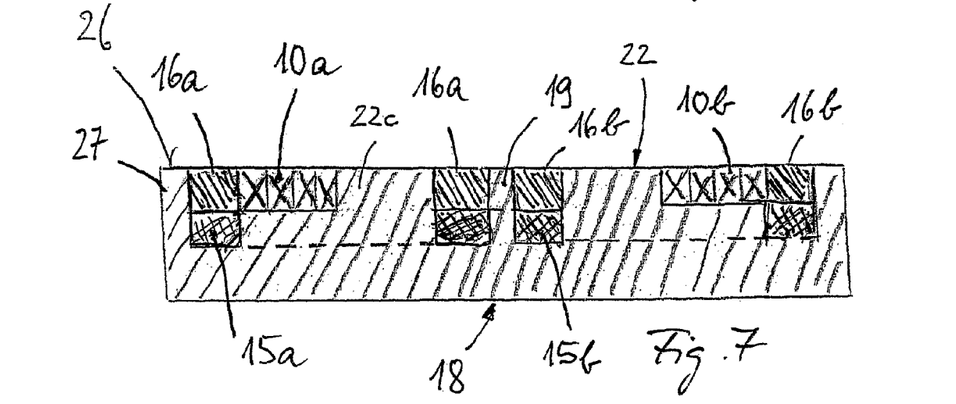
FIG. 7 is a sectional view through the basic body corresponding to FIG. 5 after mounting a receiver coil and inserting flux-conducting element.

To mount the strips 15a, 15b (FIG. 2), each half of the basic body 18 is provided, from its broad side that is the upper broad side in FIGS. 4 through 7, with a plurality of first depressions 20, whose lower limitations or bottoms are indicated by broken lines in FIGS. 5 and 7. The depressions 20 extend into a first plane 21 of the basic body 18 and are arranged at right angles to the longitudinal sides 18a and to the middle web 19, on the one hand, and in parallel to one another, on the other hand. The number and size of these depressions 20 correspond to the number and size of the strips 15a and 15b to be mounted.

Webs 22 left in place between the depressions 20 are provided according to FIGS. 5 and 6, at their ends adjoining the longitudinal sides 18a and the middle web 19, with second depressions 23, which likewise extend into the first plane 21 and are thus connected to the first depressions 20.

In one exemplary embodiment, which is considered to be the best so far and is shown in FIGS. 4 through 7, the height of the parts 22a of the webs 22 (FIG. 5) that remain after the second depressions 23 have been formed and face the longitudinal sides 18a is reduced, so that these parts reach only a second plane 24, which has a distance that corresponds to the thickness of the strips 15a and 15b from the first plane 21. Third depressions 25, which are used to mount the longitudinal sections 10a, 10b of the receiver coil 10, are formed as a result. Depressions 25 extend at right angles to the longitudinal sides 18a of the basic body 18 from the second depressions 23 to the steps 22b of the webs 22 and have a length in the direction of extension that corresponds to the width of the receiver coil 10 to be inserted, whose longitudinal sections 10a, 10b can be seen in FIG. 7.

The surfaces of parts 22c of the webs 22, whose height is reduced, are located in a third plane 26 of the basic body 18. The surfaces of an edge section 27 of the basic body 18, which extends all around, as well as of the middle web 19 are also located in this plane 16, which has a distance from the second plane 24 that corresponds essentially to the thickness of the receiver coil 10.

The basic body 18 is provided with additional depressions 28 (FIG. 4) extending into the second plane 24 in an area each adjoining the front sides 18b. The size of these depressions is selected to be such that they can receive the end windings 10c (FIG. 2) of the receiver coil 10. In addition, the height of the different layers of the receiver coil 10 is selected to be such that after it has been placed on the upper surfaces or bottoms of the depressions 25 and 28, it closes flush with the third plane 26, as is shown in FIG. 7.

The receiving unit is advantageously manufactured in the manner shown in FIG. 8 as follows:

The basic body 18 is first provided with the depressions 20, 23, 25 and 28 and webs 22 shown in FIGS. 4 through 6 by subjecting a plane-parallel panel, e.g., to a machining process, especially various milling steps. The depressions 25 and 28 then form a space intended for receiving the receiver coil 10. This space is dimensioned such that, on the one hand, the receiver coil 10 comes into contact with step 22b with its inner contour 10d when it is inserted into the basic body 18 (FIG. 7) and is hereby positioned in the transverse direction of the basic body 18 and, on the other hand, it abuts against the free ends of the middle web 19 and is thus oriented in the longitudinal direction of the basic body 18. This state is shown in the lowermost picture in FIG. 8. In other words, steps 22b and the ends of the middle web 19 form stop and positioning means for exactly positioning the receiver coil 10 in the basic body 18.

The flux-conducting elements 15a, 15b and 16a, 16b are prepared in another process step. They are prepared, e.g., by pressing and subsequent sintering from a material such as ferrite, especially a soft ferrite, and this preparation may also be carried out fully independently from the manufacture of the cover element according to the present invention. In particular, the material strips 15a, 15b are prepared, on the one hand, corresponding to FIG. 2 such that they exactly fit into the first depressions 20, which are visible in the right-hand part of FIG. 6. On the other hand, the connection elements 16a, 16b are prepared such that they exactly fit into the second depressions 23, which are visible in FIGS. 5 and 6. To avoid premature rupture of the connection elements 16a, 16b, individual pieces thereof are prepared, which have, analogously to FIG. 2, such a length that they extend over a small number of material strips 15a, 15b only (cf. FIG. 8) and are essentially only as long as the material strips 15a, 15b. The material strips 15a, 15b and connection elements 16a, 16b can subsequently be connected, corresponding to FIG. 8, second picture from the top, by means of a mounting adhesive or the like into a grid frame, which fits exactly into the depressions 20 and 23 of the basic body 18.

Regardless of whether the flux-conducting elements 15a, 15b and 16a, 16b are integrated into such a grid frame or not, they are now inserted into the depressions 20, 23 of the basic body 18. As is schematically shown in the left-hand part of FIG. 6, the material strips 15a and 15b come to lie in a depression 20 each and fill this out over the entire length. By contrast, the connection elements 16a and 16b are arranged, as is shown in FIG. 7, in the depressions 23 of the basic body 18, and they are in contact with the ends of the material strips 15a, 15b. As in the case of the grid frame, a connection of the connection elements 16a, 16b can be established with the material strips 15a, 15b by means of a mounting adhesive or the like in this case as well.

Figure 8:
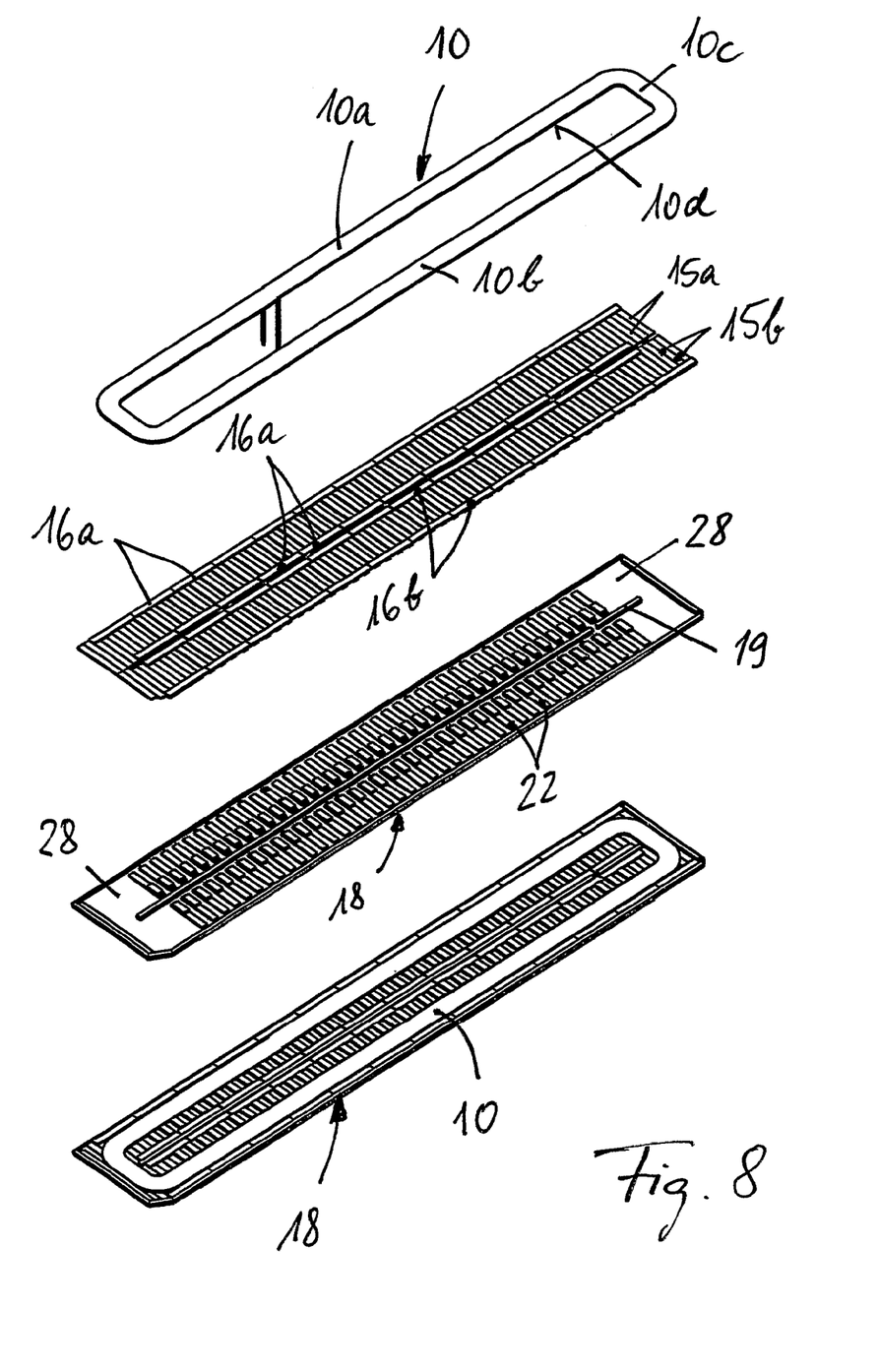
FIG. 8 is a schematic exploded perspective view showing the formation of an assembly unit according to the present invention that can be used in the manufacture of the receiving unit.

Subsequent to the insertion of the flux-conducting elements 15a, 15b, 16a, 16b, the receiver coil 10 is placed on the basic body 18, as is shown in FIGS. 7 and 8 (lowermost picture) such that their longitudinal sections 10a, 10b come to lie in the third depressions 25 and hence on the surfaces of the web parts 22a and their end windings 10c in the depressions 28.

Figure 9:
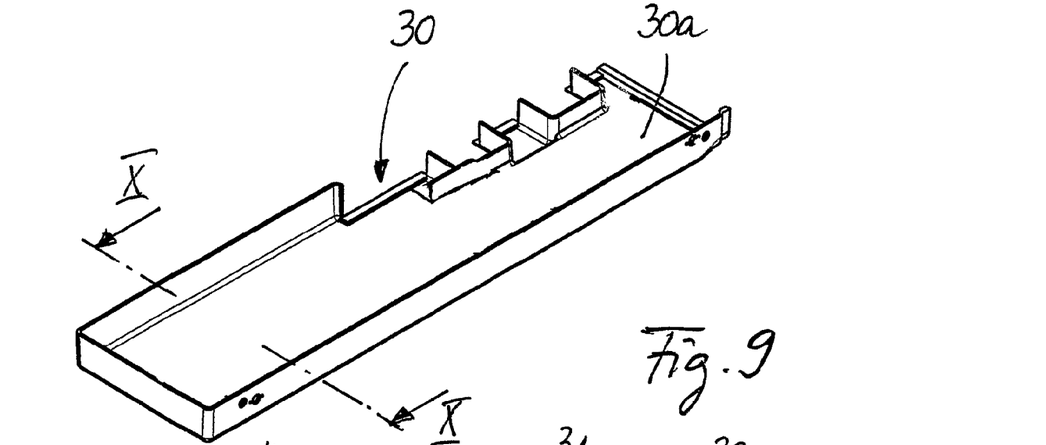
FIG. 9 shows a perspective view of an outer shell of a cover element according to the present invention, which said outer shell is intended for receiving the basic body according to FIGS. 7 and 8.
Figure 10:
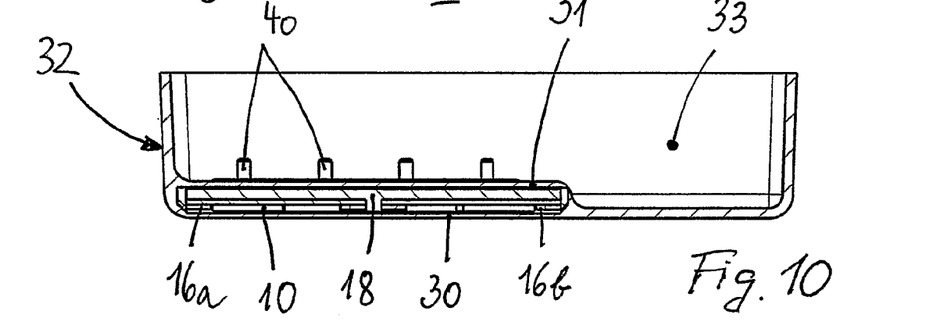
FIG. 10 is a cross sectional view approximately along line X-X in FIG. 9 through a complete cover element according to the present invention.

According to a first exemplary embodiment of the manufacturing process according to the present invention, the receiving unit, which comprises the basic body 18, the flux-conducting elements 15a, 15b and 16a, 16b as well as the receiver coil 10 and is still joined together loosely, is now placed into an outer shell 30 (FIG. 9) of a cover element corresponding to the cover element 11 in FIG. 1, which said outer shell was prepared in advance and was manufactured from a fiber-reinforced plastic. This outer shell 30 forms a component defining the outer contour of the cover element in the exemplary embodiment and at the same time a mold for manufacturing the complete cover element. The receiving unit prepared in advance is now inserted into the outer shell 30 preferably such that the receiver coil 10 comes to lie on its bottom 30a. The receiving unit is subsequently enveloped with a fiber-reinforced plastic. An inner shell 31, which is shown in FIG. 10 and is firmly connected to the outer shell 30, is formed as a result, while the receiving unit is arranged at the same time in a sandwich-like pattern between the two shells 30, 31. On the whole, a cover element 32, in which the receiving unit is integrated captively and essentially also indestructibly, is thus obtained.

The cover element 32 may contain additional components besides the receiving unit. These include, e.g., a tunable capacitor block, not shown, which is connected to the receiver coil 10, forms a resonant circuit with this and is used to tune this resonant circuit to a natural frequency of, e.g., 20 kHz, which corresponds to the frequency of the current of the primary conductor 7 (FIG. 1). In addition, additional components, which are useful or necessary for the operation of the carrier magnets 5 (FIG. 1), may be accommodated in a space 33 of the cover element 32. In addition, the basic body 18 may be provided, which is not shown, with the necessary connection contacts for the receiver coil 10, and additional components may, of course, also be arranged on the basic body 18.

A mold 34 (FIG. 11), whose cavity defines the outer contour of the cover element 32 or of the outer shell 30, is used to manufacture the cover element 32 in a second exemplary embodiment of the present invention. At least one first fiber mat 35 is first inserted, preferably in the dry state, into this mold 34 to prepare the outer shell 30. The receiving unit prepared corresponding to FIG. 8 is then placed on this fiber mat, after which at least one second, preferably likewise dry fiber mat 36 is placed on this receiving unit. The arrangement is preferably selected such that the two fiber mats 35, 36 have edge sections 35a, 36a, which lie one on top of another and extend all around, so that the receiving unit is surrounded by the fiber mats 35, 36 on all sides.

Figure 11:
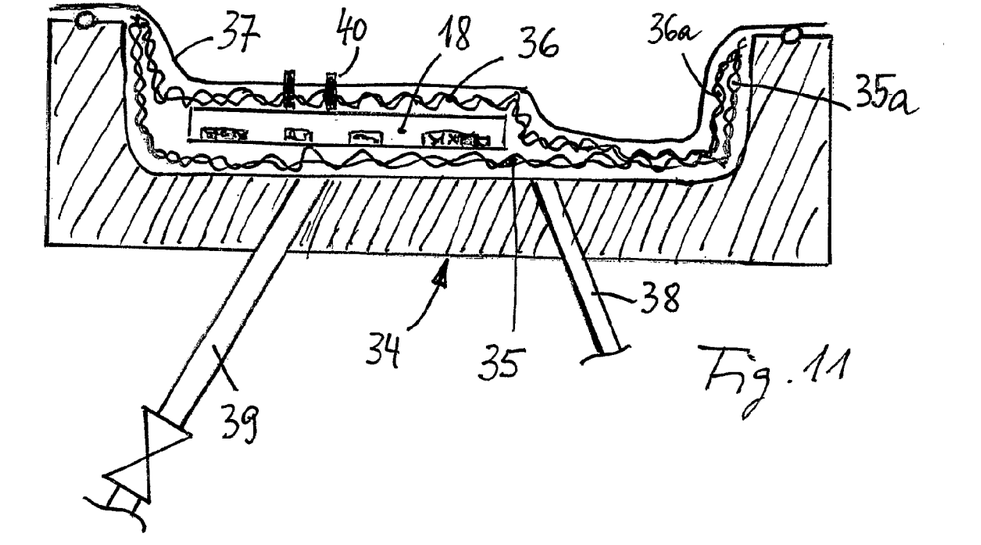
FIG. 11 is a schematic view showing a device for manufacturing the cover element according to the present invention according to FIG. 10.

The mold 34 is now lined on its top side with a film 37 or the like, which covers and seals its cavity and is connected to a vacuum pump, not shown, through a channel 38 extending into the bottom of the cavity. The fiber mats 35, 36 and the basic body 18 with its components are hereby pressed tightly against the bottom of the cavity and against one another and the edge sections 35a, 36a are brought together. A casting resin is then pressed into the cavity through a gate 39, which likewise opens, e.g., at the bottom of the mold, in order to impregnate the fiber mats 35, 36 with the casting resin, as this is commonly practiced in the manufacture of shaped parts from fiber-reinforced plastics.

The casting resin is then cured or allowed to cure, optionally at elevated temperature, after which the film 37 is peeled off and the finished cover element is removed from the mold 34. To facilitate this operation, the mold 34 may have been previously coated with a mold release agent and at least one insert part 40 (cf. FIG. 10), which makes it possible to slightly raise the finished cover element, may have been provided between the two fiber mats 35, 36. The cover element removed from the mold 34 corresponds, in turn, to the cover element 11 in FIG. 1.

One advantage of the process described is that the bottom of the outer shell 30 is made comparatively thin and the receiver coil 10 can therefore be arranged very close to the primary conductor 7 (FIG. 1), which increases the efficiency of said coil. In addition, analogously to a double-T beam, the basic body 18 forms the middle web between the two shells 30 and 31 and as a result a spacing element, which ensures high rigidity of the cover element.

The manufacture of the fiber-reinforced cover element 32 may otherwise also be carried out by means of other processes commonly used in the manufacture of fiber-reinforced and especially glass fiber-reinforced plastic parts. Besides the manual lamination and the vacuum injection described, for example, the injection molding and pressing technique and especially the use of prepregs, i.e., mats already impregnated with hot-curing resins, which are subjected to further processing by hot or cold pressing, are suitable. Furthermore, it is possible to combine a plurality of mats possessing different properties, e.g., to arrange Aramide fiber mats for sufficiently securing joints, glass fiber mats for high strength and nonwoven mats for obtaining a good optical appearance one on top of another in layers in the process described on the basis of FIGS. 10 and 11.

To simplify the manufacture of the receiving unit comprising the basic body 18, the flux-conducting elements 15a, 15b and 16a, 16b as well as the receiver coil 10, it is possible according to another preferred embodiment of the present invention to manufacture the flux-conducting elements 15a, 15b and 16a, 16b by a casting operation. The receiver coil 10 is preferably placed for this onto the finished basic body 18 preferably in the manner shown in FIG. 8 (lowermost picture) without individual flux-conducting elements 15a, 15b and 16a, 16b having been introduced before. The receiver coil 10 is then in contact with the steps 22b (FIGS. 5 and 7) and with the ends of the middle web 19, while the depressions 20, 23 remain free.

A liquid mixture, which contains a curable casting resin and a powder, which consists of a material having high permeability, is prepared in another process step. A powder of ferrite, preferably a soft ferrite, is used for this, in particular. This mixture may, of course, also have been prepared already before the manufacture of the basic body 18 and/or before the insertion of the receiver coil 10 into this.

The finished mixture, which preferably contains a multicomponent casting resin provided with a curing agent, is now poured into the depressions 23 left free by the receiver coil 10 by means of pouring nozzles, not shown. As an alternative, a pouring spout, which passes over the length of the depressions 23, may be used for this as well. The casting resin penetrates during the casting operation not only into the depressions 23, but also into the depressions 20, which extend between these and are partly under the receiver coil 10, and fills these completely. The basic body 18 is thus used as a casting mold. The casting resin is prevented from running out into the depressions 28 by raised webs 22a at the lateral ends of the web rows.

The casting operation is concluded when the level of casting resin has reached the third plane 26 (FIG. 7). As a result, the casting resin can rise up to level 26 in the areas located between the parts 22c of the webs 22, as this is indicated in FIG. 3 by a broken line 41. However, this does not compromise the function of the strips 15a, 15b as flux-conducting elements.

One advantage of the process described is that a shaped part of the type of a grid form is formed, which contains the strips 15a, 15b and connection elements 16a, 16b shown in FIGS. 2 and 3 with the difference that these are manufactured in one piece and form a one-piece, contiguous grid frame, which is arranged recessed in the basic body 18. Special measures for connecting the strips 15a, 15b and connection elements 16a, 16b are therefore unnecessary. Furthermore, it is advantageous that the receiver coil 10 is also already inserted into the basic body 18 and is firmly embedded in same by the casting operation. The basic body 18, the receiver coil 10 and the flux-conducting elements 15a, 15b, 16a, 16b therefore form a structural and receiving unit, which is completely preassembled or can be completely preassembled and which is embedded as a whole in the cover 11 (FIG. 1) of the magnetic back box 6. Finally, it is also advantageous that the cast flux-conducting elements have a higher ductility than the ferrite elements used otherwise, which are manufactured as compression moldings.

The basic body 18 is preferably manufactured from a plastic, especially a foam, e.g., polyurethane with highly damping properties. As an alternative to machining, it is possible, besides, to manufacture the basic body 18 as a whole by casting, foaming or pressing with the use of a corresponding die, in which case the depressions 25, 28 for the receiver coil 10 can be kept free, e.g., by a correspondingly shaped displacement body.

The present invention is not limited to the exemplary embodiment described, which can be varied in many different ways. This applies, in particular, to the grid frame-like structure of the flux-conducting elements shown in FIGS. 2 and 3, because these may also be arranged in other advantageous patterns and can be made larger or smaller than described. It may be advantageous, above all in case of the use of the casting process described on the basis of FIGS. 5 through 7, to design the flux-conducting elements 15a, 15b (FIG. 2) as panels passing over the length of the receiver coil 10. The webs 22 (FIGS. 5 through 7) could be eliminated altogether in this case and the depressions 20 could be made continuous in the longitudinal direction of the basic body 18. It would be possible now, e.g., to fill in a first step the entire lower space of the basic body 18 up to level 24 (FIG. 6) with the casting resin mixture, then to insert the receiver coil 10 and finally to fill the space occupied by the flux-conducting elements 16a and 16b in FIG. 7 with the casting resin mixture. The shape of the cover element 32 may be different as well, because this depends mainly on whether it is to be provided with additional components or the like or whether it is to cover such additional components. Furthermore, it is clear that the receiver coil 10 is provided with connection contacts, not shown, at suitable points and the depressions 28 (FIG. 4) may also be absent altogether, especially when it is desirable to bend off the end windings 10c to the rear analogously to DE 10 2004 056 439 A1. The cover element 32 would have to be provided with correspondingly shaped side parts in this case. Instead of flux-conducting elements made of ferrite, it would also be possible to provide flux-conducting elements consisting of other materials, e.g., soft iron, especially when the power transmission takes place at such low frequencies that the losses generated thereby are tolerable. Finally, it is obvious that the various features can also be used in combinations other than those described and shown.

While specific embodiments of the invention have been shown and described in detail to illustrate the application of the principles of the invention, it will be understood that the invention may be embodied otherwise without departing from such principles.

The invention claimed is:

1. A cover element comprising:
a cover element portion;
a receiving unit integrated in said cover element portion;
a receiver coil for the physical contactless continuous transmission of electric power between the receiving unit and a sending unit with relative movement between the receiving unit and the sending unit, the receiver coil being contained in said receiving unit; and
a plurality of flux-conducting elements associated with the receiver coil and intended to concentrate a field intensity, and which are formed of a material having high permeability compared to that of air wherein:
the cover element portion is manufactured from a fiber-reinforced plastic;
the receiving unit comprises a prefabricated basic body for positioning the flux-conducting elements and the receiver coil to establish the position of the flux-conducting elements and the receiver coil relative to each other and relative to the cover element portion; and
the receiving unit as a whole is embedded in the fiber-reinforced plastic.

2. The cover element in accordance with claim 1, wherein the basic body is provided with depressions receiving the flux-conducting elements.

3. The cover element in accordance with claim 1, wherein the basic body consists of plastic.

4. The cover element in accordance with claim 3, wherein the basic body consists of a foam having damping action.

5. The cover element in accordance with claim 1, wherein the flux-conducting elements consist of a contiguous shaped part, which is integrated with the basic body into a completely prefabricated assembly unit.

6. The cover element in accordance with claim 5, wherein the flux-conducting elements of comprise a material containing ferrite.

7. The cover element in accordance with claim 1, wherein the flux-conducting elements and the receiver coil are arranged loosely in a basic body.

8. The cover element in accordance with claim 7, wherein at least the flux-conducting elements are prefixed with an adhesive.

9. The cover element in accordance with claim 1, wherein the basic body is provided with stop and positioning means for positioning the receiver coil.

10. A cover element, comprising:
a cover element portion;
a receiving unit integrated in said cover element portion;
a receiver coil for the physical contactless transmission of electric power, the receiver coil being contained in said receiving unit; and
a plurality of flux-conducting elements associated with the receiver coil and intended to concentrate a field intensity, and which are formed of a material having high permeability compared to that of air wherein:
the cover element portion is manufactured from a fiber-reinforced plastic;
the receiving unit comprises a prefabricated basic body for positioning the flux-conducting elements and the receiver coil; and
the receiving unit as a whole is embedded in the fiber-reinforced plastic wherein the receiver coil has two longitudinal sections, which are arranged at spaced locations from one another, and end windings connecting same.

11. The cover element in accordance with claim 10, wherein:
the basic body has a space to receive the receiver coil;
webs are set up to support the longitudinal sections of the receiver coil; and
the basic body contains depressions arranged laterally from the flux-conducting elements for receiving the end windings.

12. A cover element comprising:
a cover element portion;
a receiving unit integrated in said cover element portion;
a receiver coil for the contactless transmission of electric power, the receiver coil being contained in said receiving unit; and
a plurality of flux-conducting elements associated with the receiver coil and intended to concentrate a field intensity, and which are formed of a material having high permeability compared to that of air wherein:
the cover element portion is manufactured from a fiber-reinforced plastic;
the receiving unit comprises a prefabricated basic body for positioning the flux-conducting elements and the receiver coil;
the receiving unit as a whole is embedded in the fiber-reinforced plastic; and
the cover element portion comprises an outer shell and an inner shell and the basic body is arranged as a spacer between the outer shell and the inner shell.

13. The cover element in accordance with claim 12, wherein the outer shell and the inner shell are connected to one another only in an edge section surrounding the receiving unit.

14. A process for manufacturing a cover element with a receiving unit, which is integrated in same and which contains a receiver coil for the contactless transmission of electric power and a plurality of flux-conducting elements, which are associated with the receiver coil, are intended to concentrate the field intensity and consist of a material with a high permeability compared to that of air, the process comprising the steps of:
preparing a basic body intended to receive and position the flux-conducting elements and the receiver coil;
arranging the flux-conducting elements and the receiver coil in the basic body; and
enveloping the receiving unit, with fiber-reinforced plastic wherein the outer shell is manufactured in a separate process step and is used as a mold, into which the receiving unit is inserted and is then enveloped, in the enveloping step with an inner shell firmly connected to the outer shell.

15. The process in accordance with claim 14, wherein the outer and inner shells are manufactured with the use of fiber mats impregnated with curable plastic.

16. The process in accordance with claim 15, wherein the outer and/or inner shells are manufactured by manual lamination.

17. The process in accordance with claim 15, wherein the outer and/or inner shells are manufactured with the application of pressure and/or vacuum.

18. The process in accordance with claim 15, wherein the outer and/or inner shells are manufactured with the use of prepregs.

19. The process in accordance with claim 15, wherein the outer and/or inner shells are manufactured with the use of fiber mats possessing different properties.

20. The process in accordance with claim 14, wherein a tunable capacitor block connected to the receiver coil into a resonant circuit is additionally connected to the cover element.

21. The process in accordance with claim 14, wherein the flux-conducting elements and the receiver coil are arranged loosely in the basic body and then inserted with this into the outer shell.

22. The process in accordance with claim 14, wherein:
the basic body is provided with depressions intended to receive the flux-conducting elements;
the flux-conducting elements are manufactured by pouring a liquid mixture of a casting resin and a powder consisting of a material having high permeability into the depressions of the basic body; and
the basic body is inserted into the outer shell after an at least partial curing of the mixture and after the receiver coil is mounted.

23. The process in accordance with claim 14, wherein the basic body is provided with stop means used to position the receiver coil.

24. The process in accordance with claim 14, wherein the basic body is made of a plastic, especially a foam.

25. The process in accordance with claim 14, wherein the depressions are prepared by machining the basic body.

26. The process in accordance with claim 14, wherein the basic body is manufactured in a mold designed as a negative mold of the basic body by casting, foaming or pressing.

27. The process in accordance with claim 14, wherein the receiver coil is inserted into the basic body before the mixture is poured in.

* * * * *